United States Patent
Nishina et al.

(10) Patent No.: US 6,623,402 B2
(45) Date of Patent: Sep. 23, 2003

(54) APPARATUS AND METHOD FOR DETECTING ABNORMALITIES OF A LINEAR SOLENOID VALVE AND A HYDRAULIC DEVICE USING THE SAME LINEAR SOLENOID VALVE

(75) Inventors: Masatoshi Nishina, Saitama (JP); Chihiro Matsubara, Saitama (JP); Akio Tsuura, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/119,210

(22) Filed: Apr. 10, 2002

(65) Prior Publication Data

US 2002/0151408 A1 Oct. 17, 2002

(30) Foreign Application Priority Data

Apr. 12, 2001 (JP) ........................... 2001-113557

(51) Int. Cl.[7] .............................. F16H 61/12
(52) U.S. Cl. ................ 477/92; 192/218; 251/129.15; 477/906
(58) Field of Search ............... 477/92, 906; 192/3.51, 192/218, 225, 3.58; 340/933, 451, 635; 16/272; 251/129.15

(56) References Cited

U.S. PATENT DOCUMENTS 3,937,105 A * 2/1976 Arai et al. ................ 477/906
5,460,582 A * 10/1995 Palansky et al. ........... 477/906
6,345,548 B1 * 2/2002 Ohashi et al. ............. 477/906

FOREIGN PATENT DOCUMENTS

| JP | 61-153076 A | * | 7/1986 |
| JP | 61-169330 A | * | 7/1986 |
| JP | 5-87300 A | * | 4/1993 |
| JP | 2000-266176 | | 9/2000 |

* cited by examiner

Primary Examiner—Rodney H. Bonck
(74) Attorney, Agent, or Firm—Armstrong, Westerman & Hattori, LLP

(57) ABSTRACT

An apparatus includes a linear solenoid valve regulating an oil pressure supplied to a clutch, a hydraulic switch being switched on and off upon receipt of a switching oil pressure, and a control unit controlling the actuation of the solenoid valve. A pressure-increased side signal oil pressure is detected which results when the hydraulic switch is switched on and off while a control signal is sent to the solenoid valve to increase a control oil pressure from a predetermined lower pressure to a predetermined higher pressure, and a pressure-decreased side signal oil pressure is detected which results when the hydraulic switch is switched on and off while the control signal is sent to decrease the control oil pressure from the predetermined higher pressure to the predetermined lower pressure. When a difference between these signal oil pressures exceeds an abnormalities determination value, it is determined that the solenoid valve is abnormal.

12 Claims, 12 Drawing Sheets

FIG.8

| DESIGNATED OIL PRESSURE | HYDRAULIC SW | CLUTCH STATE | ASSUMED CAUSES FOR FAILURES |
|---|---|---|---|
| 0 | ON | OFF GEAR | HYDRAULIC SWITCH FAILS TO BE SWITCHED ON |
| 0 | ON | IN GEAR | LINEAR SOLENOID VALVE STICKS TO ON SIDE |
| 0 | OFF | IN GEAR | CLUTCH STICKS, CONTROL SYSTEM IS ABNORMAL, NM SENSOR IS ABNORMAL |
| UPPER LIMIT | ON | OFF GEAR | FAILURE OF CLUTCH SYSTEM (IN A CASE WHERE THE SWITCH IS SWITCHED ON WITH A PROPER PRESSURE DESIGNATION VALUE) |
| UPPER LIMIT | OFF | OFF GEAR | LINEAR SOLENOID VALVE STICKS TO OFF SIDE |
| UPPER LIMIT | OFF | IN GEAR | HYDRAULIC SWITCH FAILS TO BE SWITCHED OFF (IN A CASE WHERE GEARS ARE ENGAGED WITH A PROPER PRESSURE DESIGNATION VALUE) |

FIG.11
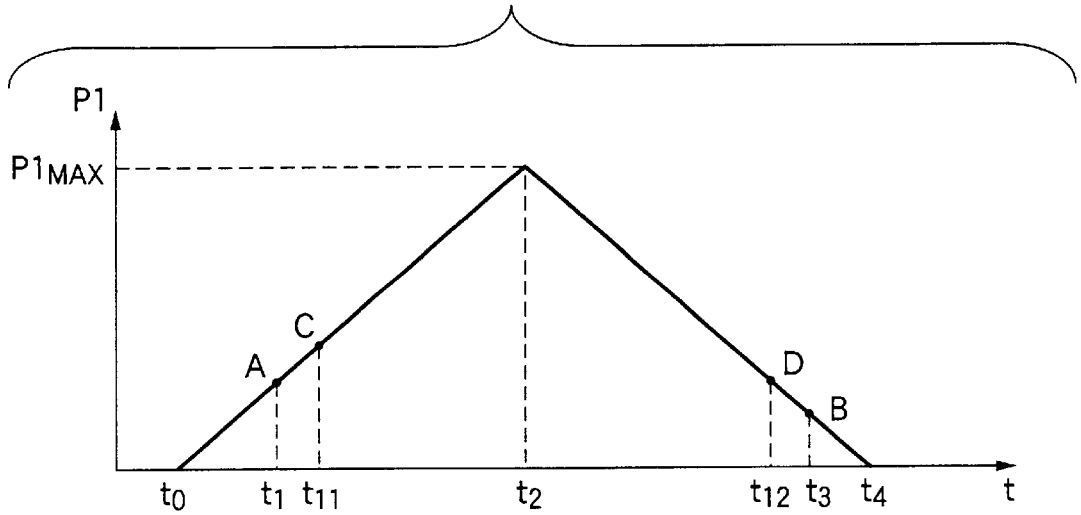
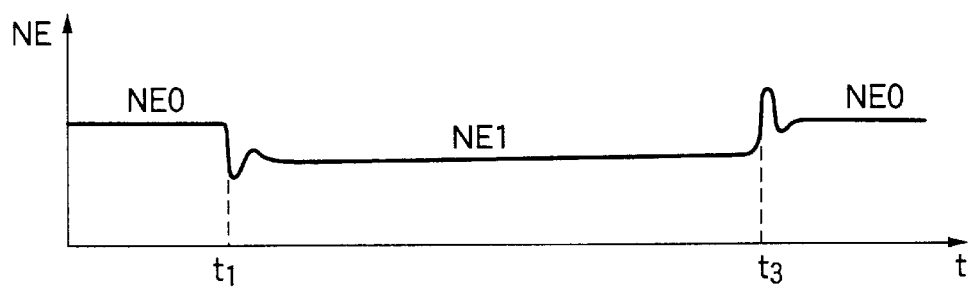
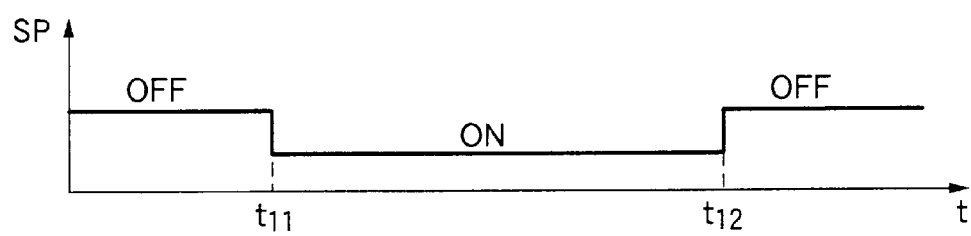
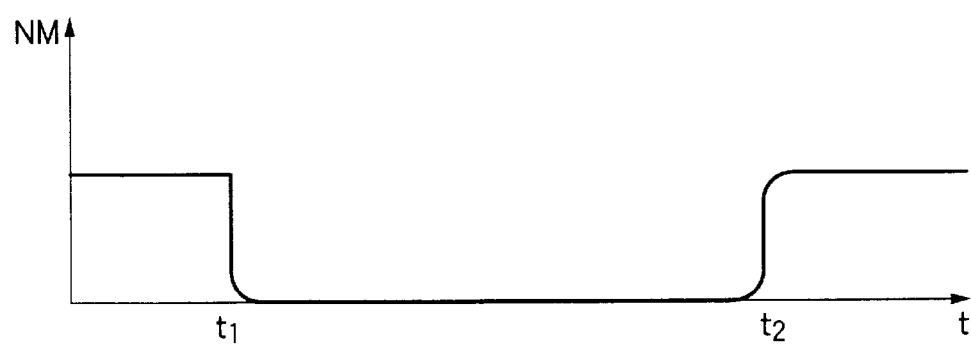

APPARATUS AND METHOD FOR DETECTING ABNORMALITIES OF A LINEAR SOLENOID VALVE AND A HYDRAULIC DEVICE USING THE SAME LINEAR SOLENOID VALVE

BACKGROUND OF THE INVENTION

1. Field of the Invention

The present invention relates to an apparatus and a method for detecting abnormalities of a linear solenoid valve for regulating a control oil pressure that is supplied to a hydraulic device based on a control signal (an electric signal). The invention relates more particularly to an apparatus and a method for detecting abnormalities of a hydraulic device having a frictional engagement element such as a hydraulically actuated clutch or brake adapted to be brought into engagement upon receipt of an oil pressure force and a linear solenoid valve for regulating an actuation control oil pressure that is supplied to the frictional engagement element.

2. Description of the Related Art

A hydraulic device is used as, for example, a transmission in an automotive automatic transmission or the like, and in general, the transmission is constructed so as to automatically control speed changes according to the opening of an accelerator and the vehicle speed. The transmission for performing such automatic speed changes is constructed to have gear trains constituting a plurality of power transmission paths, and the gear trains are automatically changed over to select any of the power transmission paths by controlling the engagement of frictional engagement elements (a hydraulic clutch, brakes and the like), whereby the speed change control is implemented. In a known engagement control of a frictional engagement element, the control is performed by controlling the supply of working oil pressure (engagement control oil pressure), and in many cases a solenoid valve is used to control the supply of working oil pressure in an electric fashion. In this case, since the malfunction of the solenoid valve results in a failure of change-speed control, it is important to detect abnormalities of the solenoid valve. For example, JP-A-2000-266176 discloses an apparatus for detecting abnormalities of a solenoid valve.

In recent automatic transmissions, in many cases, controlling the regulation of engagement control oil pressure is implemented by a linear solenoid valve. In a case where a linear solenoid valve is used to implement controlling the engagement of a frictional engagement element to thereby perform change-speed controlling, it is possible to freely regulate an engagement control oil pressure which is supplied to the frictional engagement element by controlling energizing of the linear solenoid valve, and this provides an advantage that the degree of freedom in setting an engagement control oil pressure at the time of changing speeds becomes large. However, in case there occurs an abnormality in the linear solenoid valve, it becomes impossible to control the regulation of change-speed control oil pressure, this causing a problem that the change-speed control becomes imprecise. Owing to this, conventionally, an oil pressure sensor for measuring an engagement control oil pressure outputted from the linear solenoid valve is mounted on a change-speed control device externally, and an engagement control oil pressure outputted from the linear solenoid valve relative to a control signal inputted into the linear solenoid valve is detected with the hydraulic sensor to thereby detect the existence of abnormalities of the linear solenoid valve.

Incidentally, in an automatic transmission, there is no need to use an oil pressure sensor, and in general there is mounted no oil pressure sensor, and therefore, every time an abnormality detection is implemented, an oil pressure sensor is mounted externally on the automatic transmission to detect abnormalities of the linear solenoid valves, this causing a problem that abnormality detection can be carried out only at limited places such as plants and dealerships. In addition, oil pressure sensors are expensive, and this causes a problem that there is provided an expensive abnormality detector. Furthermore, there is caused a problem that there is a risk of dust or foreign matters entering the hydraulic device when the oil pressure sensor is attached to and detached from the same device.

SUMMARY OF THE INVENTION

The invention was made in view of the above problems and an object thereof is to provide an apparatus and a method for detecting abnormalities of a linear solenoid valve and a hydraulic device using the linear solenoid valve with ease. In particular, an object of the invention is to provide an apparatus and a method for detecting abnormalities of a linear solenoid valve and a hydraulic device using the linear solenoid valve by having a hydraulic switch which is inexpensive and is equipped within an oil pressure controller of an automatic transmission in many cases.

With a view to attaining the objects, according to an aspect of the invention, there is provided an apparatus for detecting abnormalities of a linear solenoid valve comprising a linear solenoid valve (for example, first to third linear solenoid valves 51, 52, 53 in an embodiment) for regulating a control oil pressure that is supplied to a hydraulic device (for example, a second clutch 12, a third clutch 13 in the embodiment) based on a control signal, a hydraulic switch (for example, first and second hydraulic switches 61, 62 in the embodiment) set to be switched on and off when an oil pressure variation is applied thereto which overpasses a predetermined switching oil pressure, and a valve actuating controller (for example, an electronic control unit 60, an external diagnosis unit 70 or the line in the embodiment) for sending out the control signal to the linear solenoid valve, wherein the hydraulic switch is disposed in such a manner as to receive the control oil pressure that has been regulated by the linear solenoid valve. A control signal is sent from the valve actuating controller to the linear solenoid valve to increase the control oil pressure from a predetermined lower pressure which is lower than the switching oil pressure to a predetermined higher pressure which is higher than the switching oil pressure to thereby cause the linear solenoid valve to regulate the control oil pressure, during which, when the hydraulic switch is switched on and off a pressure-increased side signal oil pressure is detected which corresponds to the control signal outputted from the valve actuating controller. And, a control signal is sent from the valve actuating controller to the linear solenoid valve to decrease the control oil pressure from the predetermined higher pressure to the predetermined lower pressure to thereby cause the linear solenoid valve to regulate the working oil pressure, during which, when the hydraulic switch is switched on and off a pressure-decreased side signal oil pressure is detected which corresponds to the control signal outputted from the valve actuating controller. Further, the linear solenoid valve is diagnosed as being abnormal when a difference between the pressure-increased side signal oil pressure and the pressure-decreased side signal oil pressure exceeds an abnormality determination value.

In addition, according to another aspect of the invention, there is provided a method for detecting the existence of an abnormality of a linear solenoid valve for regulating a control oil pressure that is supplied to a hydraulic device based on a control signal using a hydraulic switch disposed at a position to receive the control oil pressure which has been regulated by the linear solenoid valve and set to be switched on and off when an oil pressure variation is applied thereto which overpasses a predetermined switching oil pressure, and the method comprises the steps of, firstly, sending a control signal to the linear solenoid valve to increase the control oil pressure from a predetermined lower pressure which is lower than the switching oil pressure to a predetermined higher pressure which is higher than the switching oil pressure, while the above step is being implemented, detecting a pressure-increased side signal oil pressure which corresponds to the control signal resulting when the hydraulic switch is switched on and off upon receipt of the control oil pressure which has been regulated by the linear solenoid valve, sending a control signal to the linear solenoid valve to decrease the control oil pressure from the predetermined higher pressure to the predetermined lower pressure, while the above step is being implemented, detecting a pressure-decreased side signal oil pressure which corresponds to the control signal resulting when the hydraulic switch is switched on and off upon receipt of the control oil pressure which has been regulated by the linear solenoid valve, and diagnosing that the linear solenoid valve is abnormal when a difference between the pressure-increased side signal oil pressure and the pressure-decreased side control oil pressure exceeds an abnormality determination value.

The hydraulic switch is switched on and off when the engagement control oil pressure varies in such a manner as to overpass the switching oil pressure both when the engagement control oil pressure varies to increase and when the engagement control oil pressure varies to decrease, and even in consideration of a control response delay, the difference between the first pressure-increased side signal oil pressure and the first pressure-decreased side signal oil pressure must be small. Namely, with the difference being large, it is determined that the linear solenoid valve is being abnormal. According to the invention, the detection of abnormalities of the linear solenoid valve is implemented based on such a determination, and according to the apparatus and method for detecting abnormalities of the linear solenoid as described above, the existence of abnormalities of the linear solenoid valve can be detected easily by using the relatively inexpensive hydraulic switch (without using an oil pressure sensor for detecting the value of an oil pressure).

According to a further aspect of the invention, there is provided an apparatus for detecting abnormalities of a hydraulic device comprising a frictional engagement element (for example, a LOW clutch 11, a second clutch 12, a third clutch 13, a fourth clutch 14, a fifth clutch 15 or the like in the embodiment) adapted to be brought into engagement upon receipt of an oil pressure force, a linear solenoid valve (for example, the first to third linear solenoid valves 51, 52, 53 in the embodiment) for regulating an engagement control oil pressure which is supplied to the frictional engagement element, a hydraulic switch (for example, the first and second hydraulic switches, 61, 62 in the embodiment) set to be switched on and off when an oil pressure variation is applied thereto which overpasses a switching oil pressure which is an engagement control oil pressure at which the frictional engagement element starts to be brought into engagement and a valve actuating controller (for example, the electronic control unit 60, the external diagnosis unit 70 or the like in the embodiment) for controlling the actuation of the linear solenoid valve so as to make the linear solenoid valve implement the regulation of the engagement control oil pressure, wherein the hydraulic switch is disposed in such a manner as to receive the control oil pressure that has been regulated by the linear solenoid valve, wherein a control signal is sent from the valve actuating controller to the linear solenoid valve to increase the engagement control oil pressure from a predetermined lower pressure which is lower than the switching oil pressure to a predetermined higher pressure which is higher than the switching oil pressure to thereby cause the linear solenoid valve to regulate the engagement control oil pressure, during which, when the hydraulic switch is switched on and off a first pressure-increased side signal oil pressure is detected which corresponds to the control signal outputted from the valve actuating controller, and wherein a control signal is sent from the valve actuating controller to the linear solenoid valve to decrease the engagement control oil pressure from the predetermined higher pressure to the predetermined lower pressure, during which, when the hydraulic switch is switched on and off a first pressure-decreased side signal oil pressure is detected which corresponds to the control signal outputted from the valve actuating controller, whereby the linear solenoid valve is diagnosed as being abnormal when a difference between the first pressure-increased side signal oil pressure and the first pressure-decreased side control oil pressure exceeds a first abnormality determination value.

With the abnormality detecting apparatus constructed as described above, the existence of abnormalities of the linear solenoid valve can be detected easily by using the relatively inexpensive hydraulic switch (without using an oil pressure sensor for detecting the value of an oil pressure). In addition, in many cases, the hydraulic switch is provided on the hydraulic device such as a change-speed control valve in an automatic transmission, and as this occurs, it is possible to construct such that the detection of abnormalities can be implemented easily without requiring the selection of a place by using the hydraulic switch.

According to another aspect of the invention, the apparatus for detecting abnormalities is provided with an engagement detection unit (for example, the electronic control unit 60 adapted to be actuated upon receipt of a detection signal from an engine speed sensor 65 in the embodiment) for detecting an engagement of the frictional engagement element, wherein a control signal is sent from the valve actuating controller to the linear solenoid valve to increase the engagement control oil pressure from the predetermined lower pressure to the predetermined higher pressure to thereby cause the linear solenoid valve to regulate the frictional engagement control oil pressure, during which a second pressure-increased side signal oil pressure resulting when the engagement of the frictional engagement element is started is detected by the engagement detection unit, whereby the hydraulic switch may be diagnosed as being abnormal when a difference between the first pressure-increased side signal oil pressure and the second pressure-increased side signal oil pressure exceeds a second abnormality determination value.

According to a further aspect of the invention, the apparatus for detecting abnormalities is provided with an engagement detection unit for detecting an engagement of the frictional engagement element, wherein a control signal is sent from the valve actuating controller to the linear solenoid valve to decrease the engagement control oil pressure from the predetermined higher pressure to the predetermined lower pressure to thereby cause the linear solenoid valve to regulate the frictional engagement control oil pressure, during which a second pressure-decreased side signal oil pressure resulting when the release of the frictional engagement element is started is detected by the engagement detection unit, whereby the hydraulic switch is diagnosed as being abnormal when a difference between the first pressure-decreased side signal oil pressure and the second pressure-decreased side signal oil pressure exceeds a third abnormality determination value.

The hydraulic switch is set to use as the switching oil pressure the engagement control oil pressure at which the engagement of the frictional engagement element is started, and as described above, in the event that the difference between the first pressure-increased side signal oil pressure and the second pressure-increased side signal oil pressure exceeds the second abnormality determination value, or in the event that the difference between the first pressure-decreased side signal oil pressure and the second pressure-decreased side signal oil pressure exceeds the third abnormality determination value, it is considered that an abnormality is being caused such as the set switching oil pressure at which the hydraulic switch is switched on and off is deviated or the hydraulic switch fails to operate properly. Then, according to the invention, abnormalities of the hydraulic switch can also be detected based on the above determination.

In addition, in the invention, in the event that the frictional engagement element is used as a clutch for a transmission for controlling speed changes of a vehicle or as a brake, the detection of engagement of the frictional engagement element by the engagement detection unit is implemented with the vehicle being at halt, the brakes of the vehicle being applied and an engine of the vehicle being in an idle state. Furthermore, in a construction in which a torque converter is disposed at an input portion of the transmission in such a manner as to be connected to an output shaft of the engine and in which a transmission mechanism whose actuation is controlled by the frictional engagement element is provided in such a manner as to be connected to an output side of the torque converter, it is preferable that abnormalities are detected with the abnormality detecting apparatus according to the invention.

According to a further aspect of the invention, there is provided a method for detecting the existence of an abnormality of a linear solenoid valve for regulating based on a control signal an engagement control oil pressure which is supplied to a frictional engagement element adapted to be brought into engagement upon receipt of an oil pressure force using a hydraulic switch set to be switched on and off when an oil pressure variation is applied thereto which overpasses a predetermined switching oil pressure, wherein the hydraulic switch is disposed at a position to receive the control oil pressure that has been regulated by the linear solenoid valve and is set to be switched on and off at an engagement control oil pressure at which the frictional engagement element starts to be brought into engagement and which acts as the switching oil pressure. The method comprises the steps of sending a control signal to the linear solenoid valve to increase the engagement control oil pressure from a predetermined lower pressure which is lower than the switching oil pressure to a predetermined higher pressure which is higher than the switching oil pressure, while the above step is being implemented, detecting a first pressure-increased side signal oil pressure which corresponds to the control signal resulting when the hydraulic switch is switched on and off upon receipt of the engagement control oil pressure which has been regulated by the linear solenoid valve, sending a control signal to the linear solenoid valve to decrease the engagement control oil pressure from the predetermined higher pressure to the predetermined lower pressure, while the above step is being implemented, detecting a first pressure-decreased side signal oil pressure which corresponds to the control signal resulting when the hydraulic switch is switched on and off upon receipt of the engagement control oil pressure which has been regulated by the linear solenoid valve, whereby the linear solenoid valve is diagnosed as being abnormal when a difference between the first pressure-increased side signal oil pressure and the first pressure-decreased side control oil pressure exceeds a first abnormality determination value.

The above abnormality detecting method may comprise further the steps of detecting an engagement of the frictional engagement element when making the linear solenoid valve implement the regulation of the engagement control oil pressure by sending a control signal to the linear solenoid valve to increase the engagement control oil pressure from the predetermined lower pressure to the predetermined higher pressure, detecting a second pressure-increased side signal oil pressure which corresponds to the control signal resulting when the engagement of the frictional engagement element is started, whereby the hydraulic switch is diagnosed as being abnormal when a difference between the first pressure-increased side signal oil pressure and the second pressure-increased side signal oil pressure exceeds a second abnormality determination value.

The above abnormality detecting method may comprise further the steps of detecting an engagement of the frictional engagement element when making the linear solenoid valve implement the regulation of the engagement control oil pressure by sending a control signal to the linear solenoid valve to decrease the engagement control oil pressure from the predetermined higher pressure to the predetermined lower pressure, detecting a second pressure-decreased side signal oil pressure which corresponds to the control signal resulting when the release of the frictional engagement element is started, whereby the hydraulic switch is diagnosed as being abnormal when a difference between the first pressure-decreased side signal oil pressure and the second pressure-decreased side signal oil pressure exceeds a third abnormality determination value.

According to the abnormality detecting method of the invention which is constructed as has been described heretofore, the existence of abnormalities of the linear solenoid valve can be detected easily using the relatively inexpensive hydraulic switch (without using the oil pressure sensor for detecting the value of an oil pressure). In addition, in many cases, the hydraulic switch is provided on the hydraulic device such as the change-speed control valve of the automatic transmission, and in such a case, the detection of abnormalities can be implemented using the hydraulic switch easily without selecting any specific place for the detection. Furthermore, abnormalities of the hydraulic switch can be detected easily by obtaining the signal oil pressure when the engagement or release of the frictional engagement element is started.

BRIEF DESCRIPTION OF THE DRAWINGS

FIG. 8 is a table explaining the details of abnormalities detection according to the invention;

FIG. 11 is a graph showing time variations of designated oil pressure, engine speed, hydraulic switch output signal and transmission input shaft revolution speed which are described in the flowchart shown in FIG. 10.

DETAILED DESCRIPTION OF THE PREFERRED EMBODIMENTS

Referring to the appended drawings, a preferred embodiment of the invention will be described below. Firstly, referring to FIGS. 2 to 5, an automatic transmission will be described to which an apparatus and a method for detecting abnormalities according to the invention is applied. This transmission includes a torque converter TC connected to an engine output shaft (not shown), a parallel axes type transmission mechanism TM connected to an output member (a turbine) of the torque converter TC and a differential mechanism DF having a final reduction driven gear 6b which meshes with a final reduction drive gear 6a of the transmission mechanism TM, whereby drive force is transmitted to left and right wheels from the differential mechanism DF. All of the above transmission constituent components are disposed within a transmission housing HSG.

Figure 2:
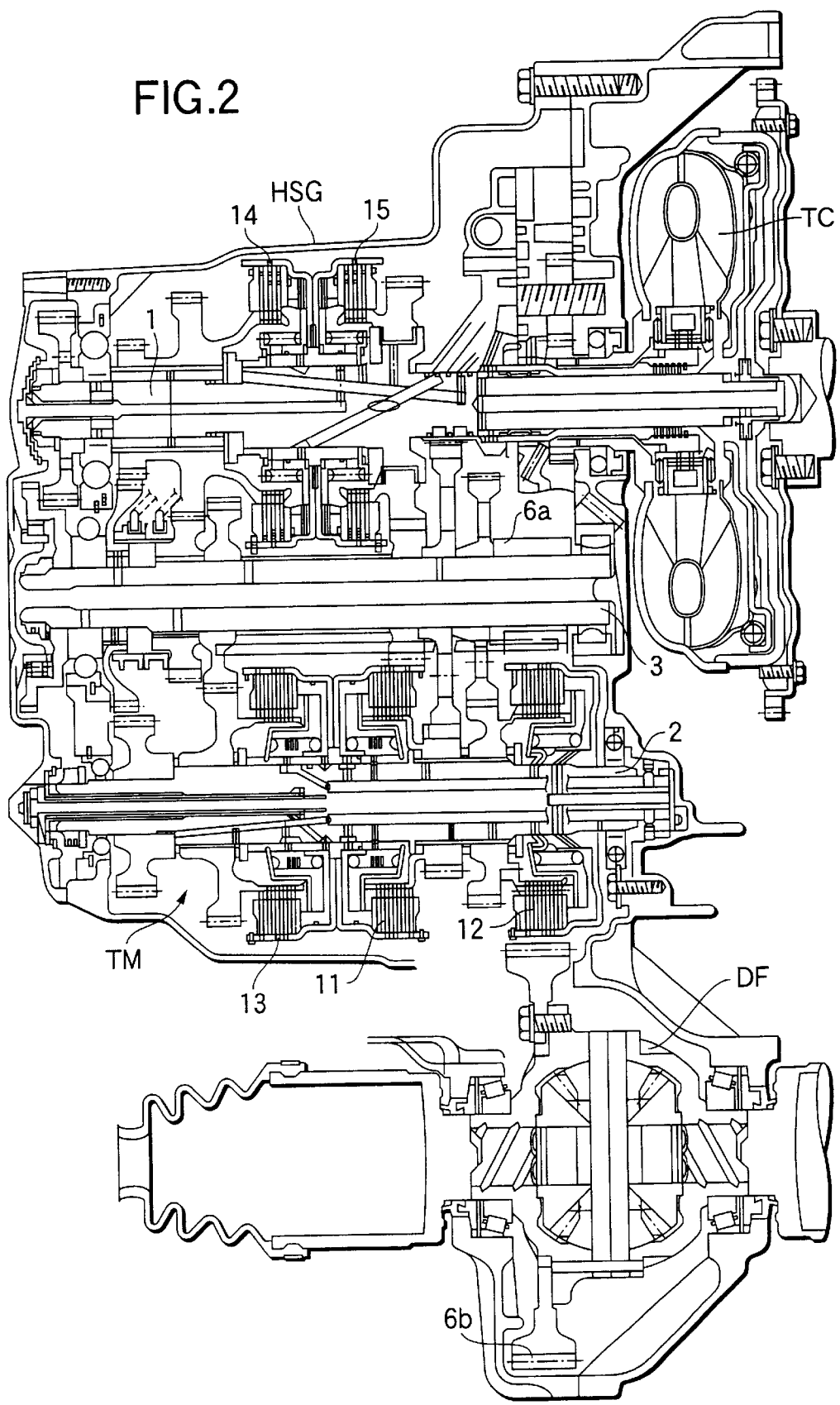
FIG. 2 is a sectional view showing the construction of an automatic transmission which is a subject to be detected by the abnormalities detection apparatus.
Figure 3:
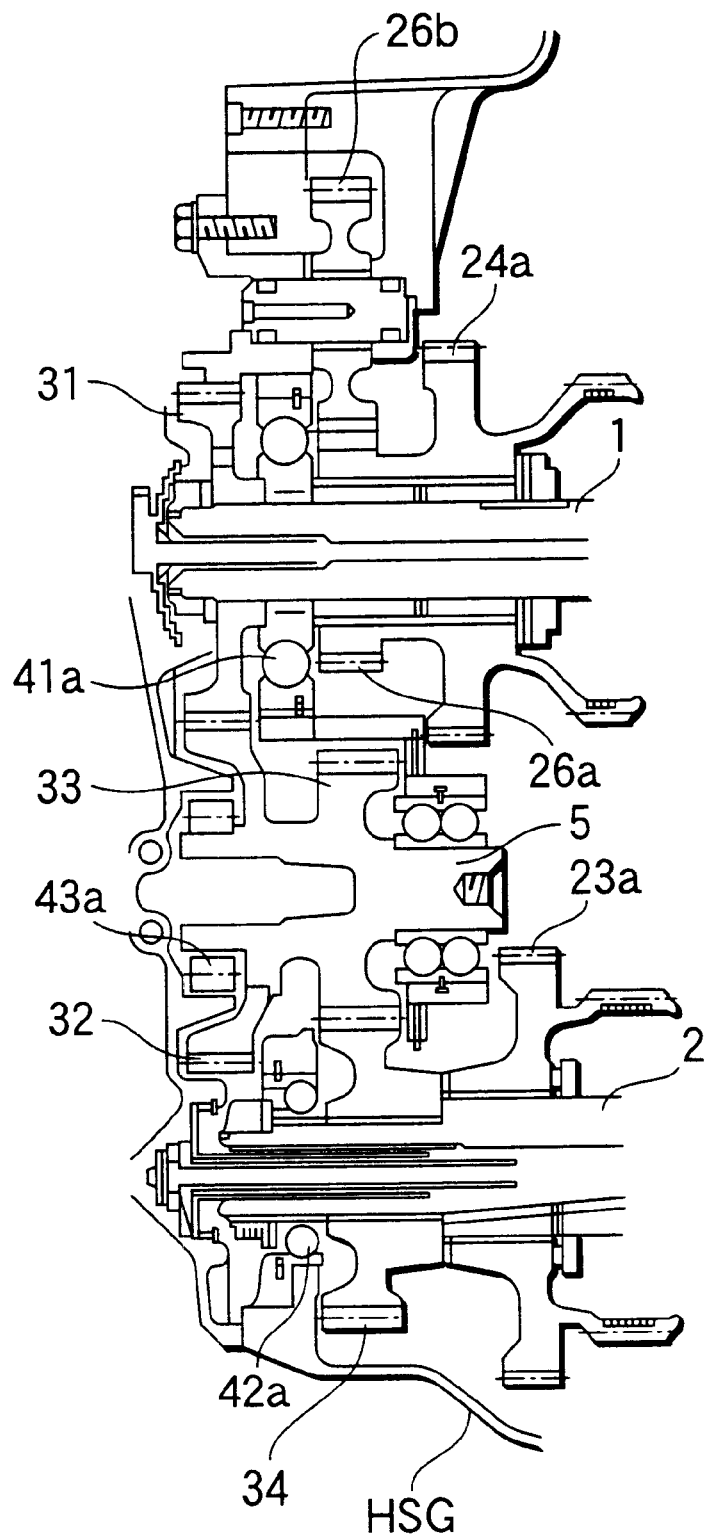
FIG. 3 is a sectional view showing the construction of the automatic transmission.
Figure 4A:
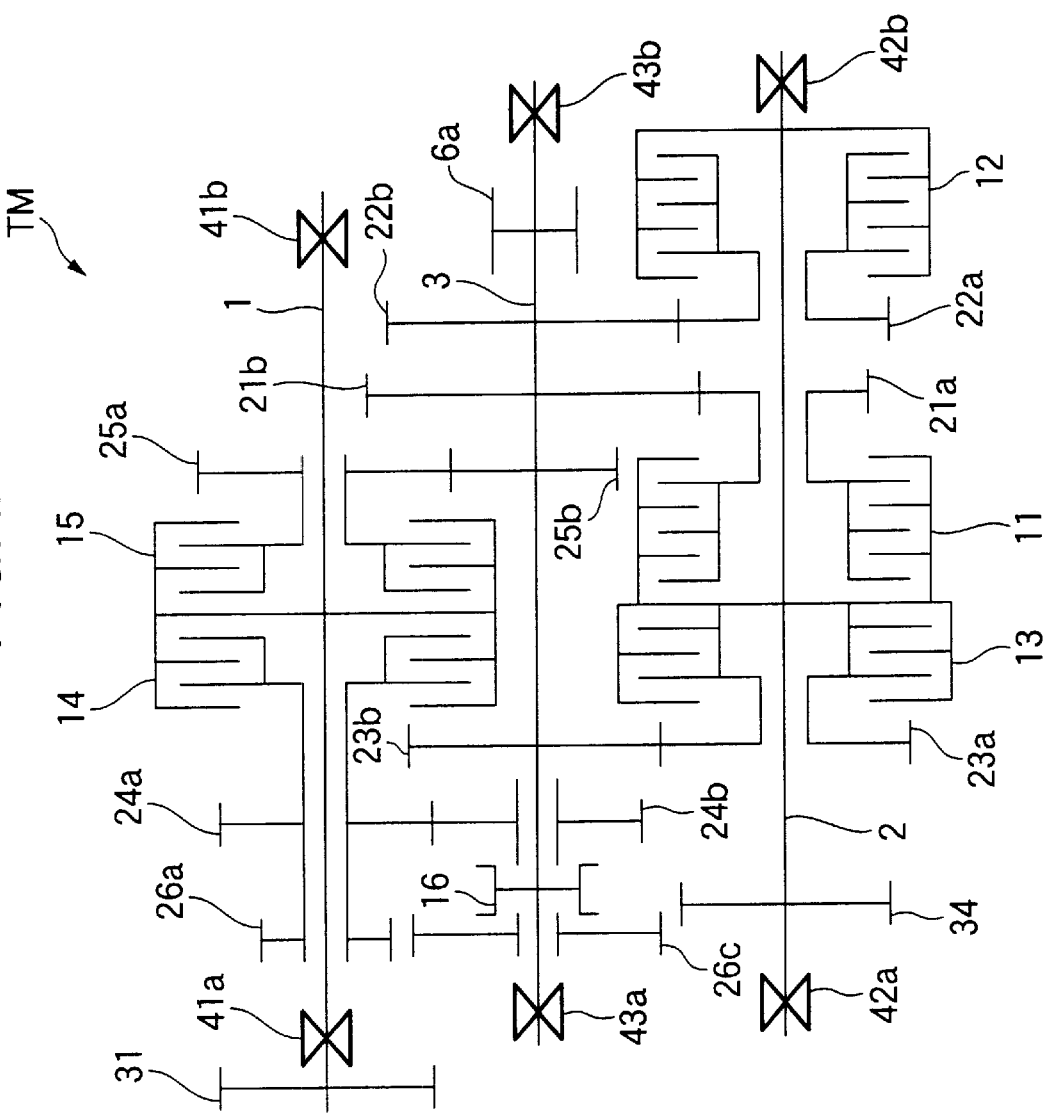
FIGS. 4A and 4B are schematic views showing power transmission path construction of the automatic transmission.
Figure 4B:
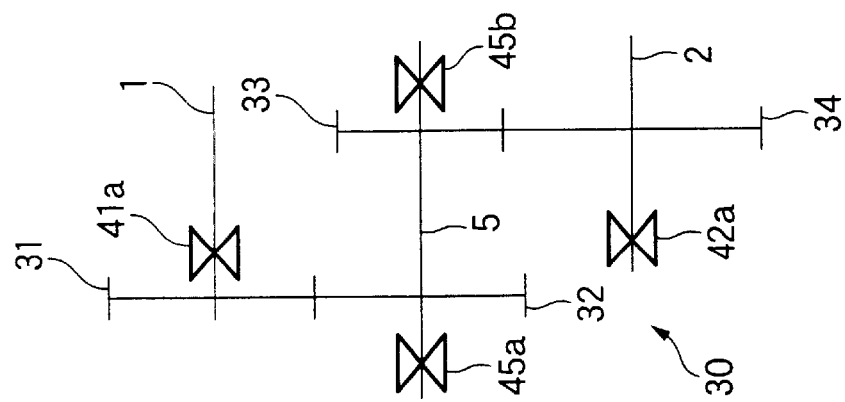
Figure 5:
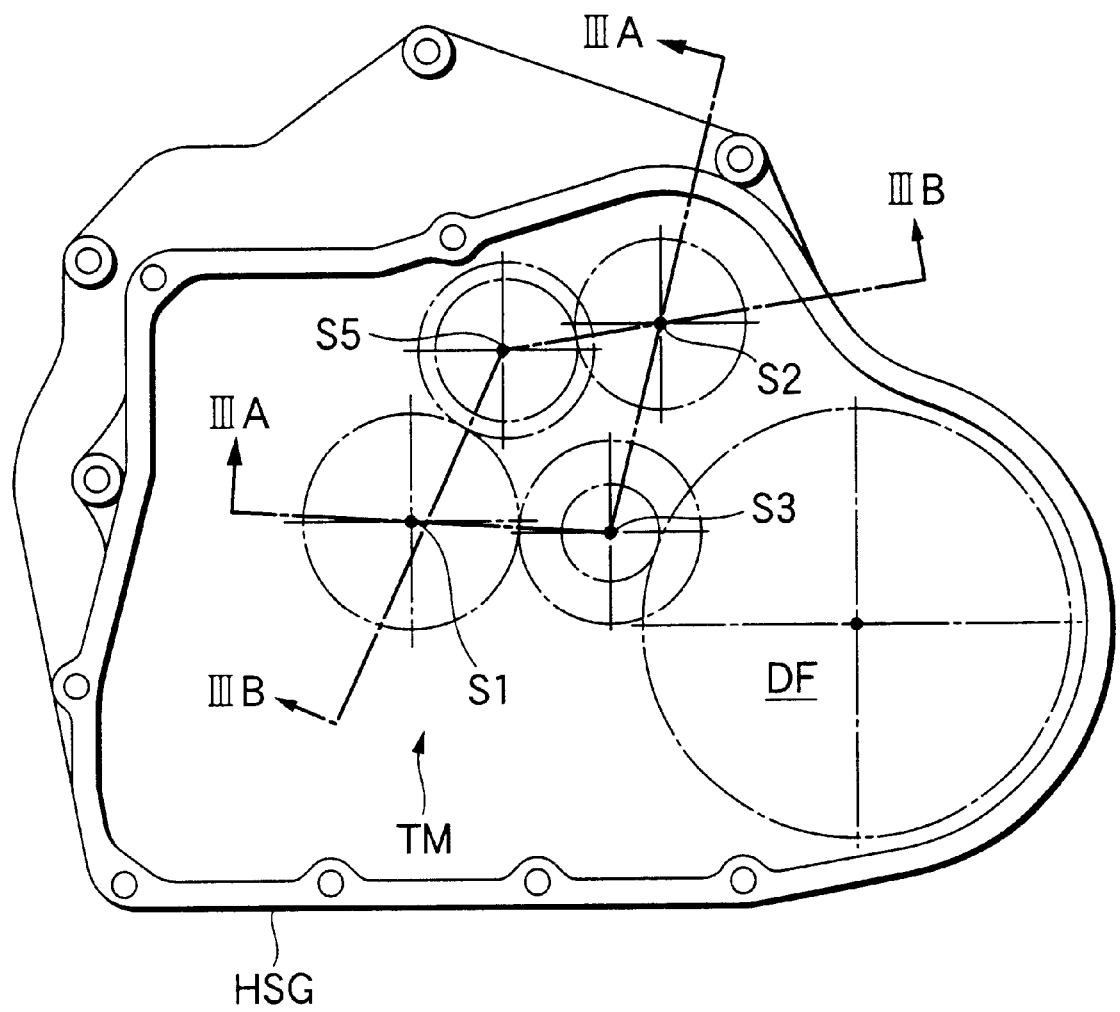
FIG. 5 is a schematic side view showing a physical relationship of axes of the automatic transmission.

The parallel axes type transmission mechanism TM is constructed to have a first input shaft 1, a second input shaft 2, a countershaft 3 and an idler shaft 5 which extend in parallel with one another. Axial centers of the respective shafts are disposed at positions indicated as S1, S2, S3 and S5 in FIG. 5. The power transmission structure of this parallel axes type transmission mechanism TM is shown in FIGS. 4A and 4B, in which FIG. 4A shows a sectional view passing through the first input shaft 1 (S1), the countershaft 3 (S3) and the second input shaft 2 (S2) along the line IIIA—IIIA shown in FIG. 5 and FIG. 4B shows a sectional view passing through the first input shaft 1 (S1) the idler shaft 5 (S5) and the second input shaft 2 (S2) along the line IIIB—IIIB shown in FIG. 5. In addition, FIG. 2 is a sectional view of the transmission mechanism TM corresponding to FIG. 4A and FIG. 3 is a sectional view of the transmission mechanism TM corresponding to FIG. 4B.

The first input shaft 1 is connected to a turbine of the torque converter TC and is rotatably supported by bearings 41a, 41b. The first input shaft 1 receives drive force from the turbine and rotates together with the turbine. Disposed on the first input shaft 1 sequentially from the torque converter side (the right-hand side as viewed in the figures) are a fifth drive gear 25a, a fifth clutch 15, a fourth clutch 14, a fourth drive gear 24a, a reverse drive gear 26a and a first connecting gear 31. The fifth drive gear 25a is disposed rotatably on the first input shaft 1 and is engaged with and disengaged from the first input shaft 1 by the fifth clutch 15 which is actuated by virtue of oil pressure force. In addition, the fourth drive gear 24a and the reverse drive gear 26a are connected to each other integrally and are disposed rotatably on the first input shaft 1, whereby the gears are engaged with and disengaged from the first input shaft 1 by the fourth clutch 14 which is actuated by virtue of oil pressure force. The first connecting gear 31 is located outwardly of the bearing 41a which rotatably supports the first input shaft 1 and is connected to the first input shaft 1 in a cantilever fashion.

The second input shaft 2 is rotatably supported by bearings 42a, 42b, and disposed on this shaft sequentially from the right-hand as viewed in the figures are a second clutch 12, a second drive gear 22a, a LOW drive gear 21a, a LOW clutch 11, a third clutch 13, a third drive gear 23a and a fourth connecting gear 34. The second drive gear 22a, the LOW drive gear 21a and the third drive gear 23a are rotatably disposed on the second input shaft 2 and are engaged with and disengaged from the second input shaft 2 by the second clutch 12, the LOW clutch 11 and the third clutch 13, respectively, which are actuated by virtue of oil pressure force. The fourth connecting gear 34 is connected to the second input shaft 2.

The idler shaft 5 is rotatably supported by bearings 45a, 45b, and provided integrally on this shaft are a second connecting gear 32 and a third connecting gear 33. The second connecting gear 32 meshes with the first connecting gear 31, and the third connecting gear 33 meshes with the fourth connecting gear 34. A connecting gear train 30 are constituted by these first to fourth connecting gears, and the rotation of the first input shaft 1 is normally transmitted to the second input shaft 2 via the connecting gear train 30.

The countershaft 3 is rotatably supported by bearings 43a, 43b, and disposed on this shaft sequentially from the right-hand as viewed in the figures are a final reduction drive gear 6a, a second driven gear 22b, a LOW driven gear 21b, a fifth driven gear 25b, a third driven gear 23b, a fourth driven gear 24b, a dog clutch 16 and a reverse driven gear 26c. The final reduction drive gear 6a, the second driven gear 22b, the LOW driven gear 21b, the fifth driven gear 25b and the third driven gear 23b are connected to the countershaft 3 and rotate together therewith. The fourth driven gear 24b is rotatably disposed on the countershaft 3. In addition, the reverse driven gear 26c is also rotatably disposed on the countershaft 3. The dog clutch 16 is actuated in axial directions so that the fourth driven gear 24b and the reverse driven gear 24b are engaged with and disengaged from the countershaft 3, respectively.

In addition, as shown in the figures, the LOW drive gear 21a meshes with the LOW driven gear 21b, the second drive gear 22a with the second driven gear 22b, the third drive gear 23a with the third driven gear 23b, the fourth drive gear 24a with the fourth driven gear 24b and the fifth drive gear 25a with the fifth driven gear 25b. Furthermore, the reverse drive gear 26a meshes with the reverse driven gear 26c via a reverse idler gear 26b (refer to FIG. 3).

While not shown in the figures, the final reduction drive gear 6a meshes with the final driven gear 6b (refer to FIG.

2), and the rotation of the countershaft 3 is transmitted to the differential mechanism DF via these final reduction drive and driven gears 6a, 6b.

In the transmission constructed as described above, setting of the respective gears and power transmission paths thereof will be described. In addition, in this transmission, in a forward range, the dog clutch 16 is moved to the right as viewed in the figures, whereby the fourth driven gear 24b is brought into engagement with the countershaft 3. In a reverse range, the dog clutch 16 is moved to the left, so that the reverse driven gear 26c is brought into engagement with the countershaft 3.

Firstly, the respective gears in the forward range will be described. The LOW gear is set through the engagement of the LOW clutch 11. Rotational driving force transmitted from the torque converter TC to the first input shaft 1 is transmitted to the second input shaft 2 via the connecting gear train 30. Here, since the LOW clutch 11 is in engagement therewith, the LOW drive gear 21a rotates together with the second input shaft 2, and the LOW driven gear 21b meshing with the LOW drive gear is then driven to rotate, the countershaft 3 being driven. The driving force is then transmitted to the differential mechanism DF via the final reduction gear train 6a, 6b.

The second gear is set through the engagement of the second clutch 12. Rotational driving force transmitted to the first input shaft 1 from the torque converter TC is transmitted to the second input shaft 2 via the connecting gear train 30. Here, since the second clutch 12 is in engagement therewith, the second drive gear 22a rotates together with the second input shaft 2, and the second driven gear 22b meshing with the second drive gear is driven to rotate, whereby the countershaft 3 is driven. The driving force is transmitted to the differential mechanism DF via the final reduction gear train 6a, 6b.

The third gear is set through engagement of the third clutch 13. Rotational driving force transmitted to the first input shaft 1 from the torque converter TC is transmitted to the second input shaft 2 via the connecting gear train 30. Here, since the third clutch 13 is in engagement therewith, the third drive gear 23a rotates together with the second input shaft 2, and the third driven gear 23b meshing with the third drive gear 23a is driven to rotate, whereby the countershaft 3 is driven. The driving force is transmitted to the differential mechanism DF via the final reduction gear train 6a, 6b.

The fourth gear is set through engagement of the fourth clutch 14. Rotational driving force transmitted to the first input shaft 1 from the torque converter TC drives to rotate the fourth drive gear 24a via the fourth clutch 14, and the fourth driven gear 24b meshing with the-fourth drive gear is driven to rotate. Here in the forward range, since the fourth driven gear 24b is engaged with the countershaft 3 by the dog clutch 16, the countershaft 3 is driven, and the driving force is then transmitted to the differential mechanism DF via the final reduction gear train 6a, 6b.

The fifth gear is set through engagement of the fifth clutch 15. Rotational driving force transmitted to the first input shaft 1 from the torque converter TC drives to rotate the fifth drive gear 25a via the fifth clutch 15, and the fifth driven gear 25b meshing with the fifth drive gear 25a is driven to rotate. Since the fifth driven gear 25b is connected to the countershaft 3, the countershaft 3 is driven, and the driving force is then transmitted to the differential mechanism DF via the final reduction gear train 6a, 6b.

The reverse gear is set through engagement of the fourth clutch and movement of the dog clutch 16 to the left. Rotational driving force transmitted to the first input shaft 1 from the torque converter TC rotates the reverse drive gear 26a via the fourth clutch 14, and the reverse driven gear 26c meshing with the reverse drive gear 26a via the reverse idler gear 26b is driven to rotate. Here, in the reverse range, since the reverse driven gear 26c is engaged with the countershaft 3 by the dog clutch 16, the driving force is transmitted to the differential mechanism DF via the final reduction gear train 6a, 6b. As is seen from this, the fourth clutch 14 also functions as a reverse clutch.

In the automatic transmission constructed as described above, as is seen from the description made heretofore, the respective forward gears can be set by actuating the dog clutch 16 to engage with the LOW clutch 11, the second clutch 12, the third clutch 13, the fourth clutch 14 and the fifth clutch 15, whereby an automatic transmission control can be implemented by controlling the above engagements based on the vehicle speed and the engine throttle opening.

Figure 1:
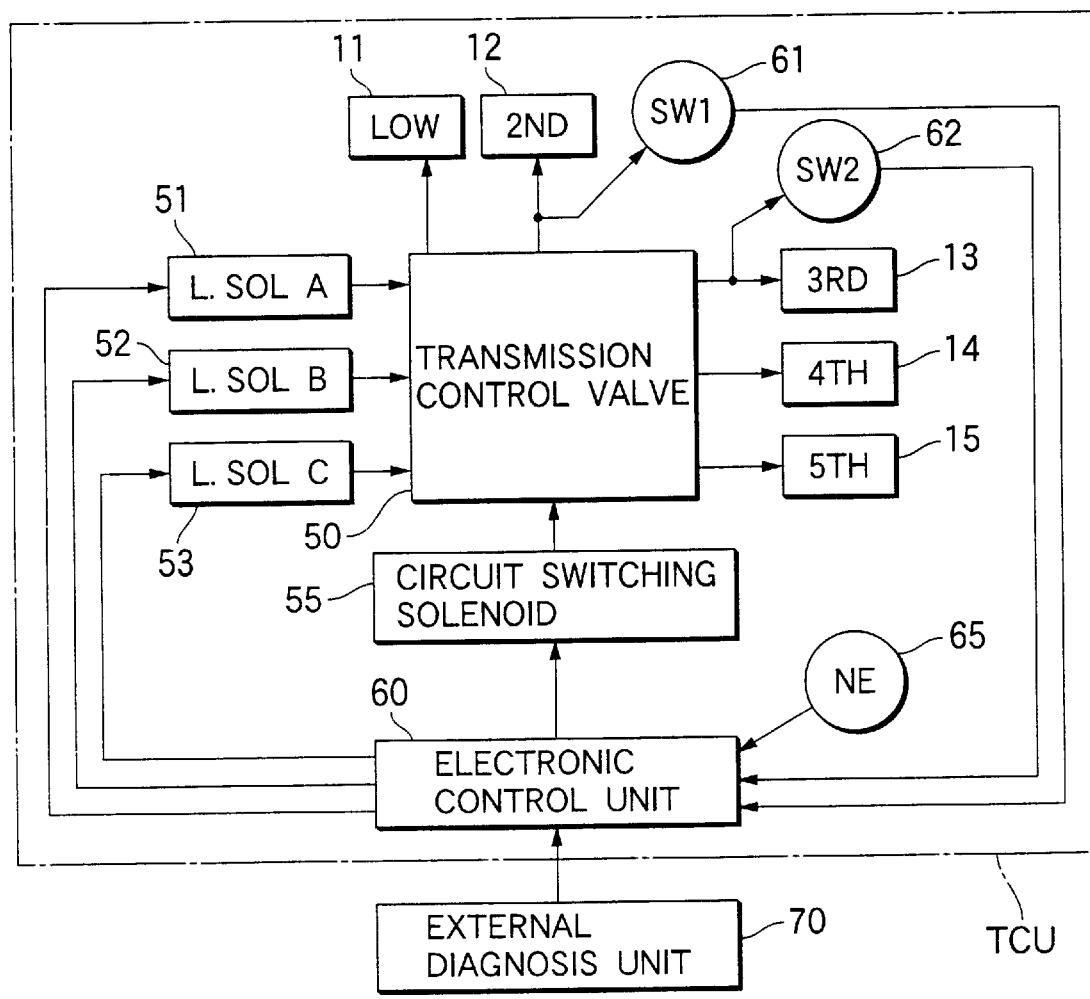
FIG. 1 is a block diagram showing the configuration of an abnormalities detection apparatus according to the invention.

Referring to FIG. 1, the construction of an apparatus for performing the automatic transmission control will be described below. An automatic transmission control unit TCU includes a transmission control valve 50, first to third linear solenoid valves 51 to 53, a group of circuit switching solenoid valves 55 and an electronic control unit 60. The transmission control valve 50 controls the supply of engagement control oil pressure to the LOW clutch 11, the second clutch 12, the third clutch 13, the fourth clutch 14, the fifth clutch 15 and the like (in addition thereto, there is a servo cylinder for actuating the dog clutch 16). The first to third linear solenoid valves 51 to 53 set engagement control oil pressures that are supplied to the respective clutches. The group of circuit switching solenoid valves 55 includes a plurality of ON/OFF solenoid valves for controlling the actuation of shift valves constituting the transmission control valve 50. The electronic control unit 60 sends control signals to the first to third linear solenoid valves 51 to 53 and the group of circuit switching solenoid valves 55 for controlling the actuation thereof.

A first hydraulic switch 61 and a second hydraulic switch 62 are provided in the transmission control valve 50. The first hydraulic switch 61 is adapted to be switched on and off upon receipt of engagement control oil pressure that is supplied to the second clutch 12. The second hydraulic switch 62 is adapted to be switched on and off upon receipt of engagement control oil pressure that is supplied to the third clutch 13. ON/OFF signals from these first and second hydraulic switches 61, 62 are inputted into the electronic control unit 60. In addition, an engine speed signal Ne detected by the engine speed sensor 65 for detecting the engine speed is also inputted into the electronic control unit 60. Note that while additional various signals (for example, engine throttle opening signal, vehicle speed signal, brake apply signal and the like) are also inputted into the electronic control unit 60, the illustration thereof is omitted herein.

Upon receipt of various signals which are inputted thereinto as described above, the electronic control unit 60 selects a gear suitable for then running conditions in response to the vehicle speed and the engine throttle opening, controls the actuation of the transmission control valve 50 so as to set the selected gear and selectively supply engagement control oil pressures to the LOW clutch 11, the second clutch 12, the third clutch 13, the fourth clutch, and the fifth clutch 15. As this occurs, the control of the actuation of the first to third linear solenoid valves 51 to 53 is carried out at the same time, whereby the control of engagement control oil pressures is implemented, a smooth transmission control being thereby effected.

Figure 6A:
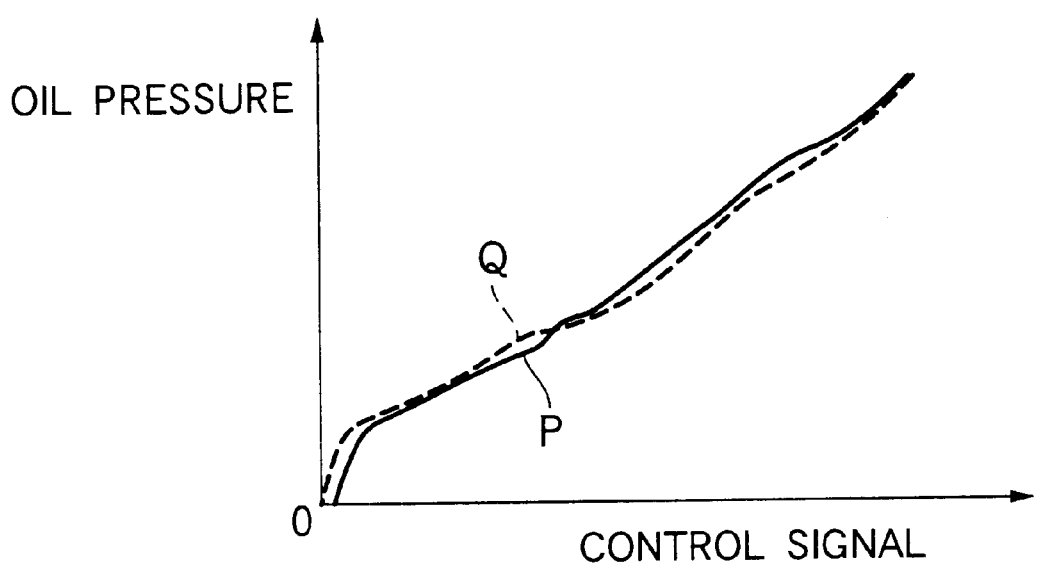
FIGS. 6A and 6B are graphs showing characteristics of a linear solenoid valve which is detected with respect to abnormalities thereof in accordance with the invention.

In the transmission control unit TCU constructed as described above, the first to third linear solenoid valves 51 to 53 are such that control engagement control oil pressures in response to control signals (control electric current) sent from the electronic control unit 60 and have, for example, characteristics shown in FIG. 6A. Namely, as shown in the figure, the electronic control unit 60 has characteristics that as a control signal (control electric current) sent to the linear solenoid valves 51 to 53 increases, a control oil pressure to be controlled thereby becomes higher. In addition, in FIG. 6A, a solid line P indicates the variation characteristics of a control oil pressure when the control signal is increased gradually from zero, and a broken line Q indicates the variation characteristics of a control oil pressure when the control signal is decreased gradually.

Figure 6B:
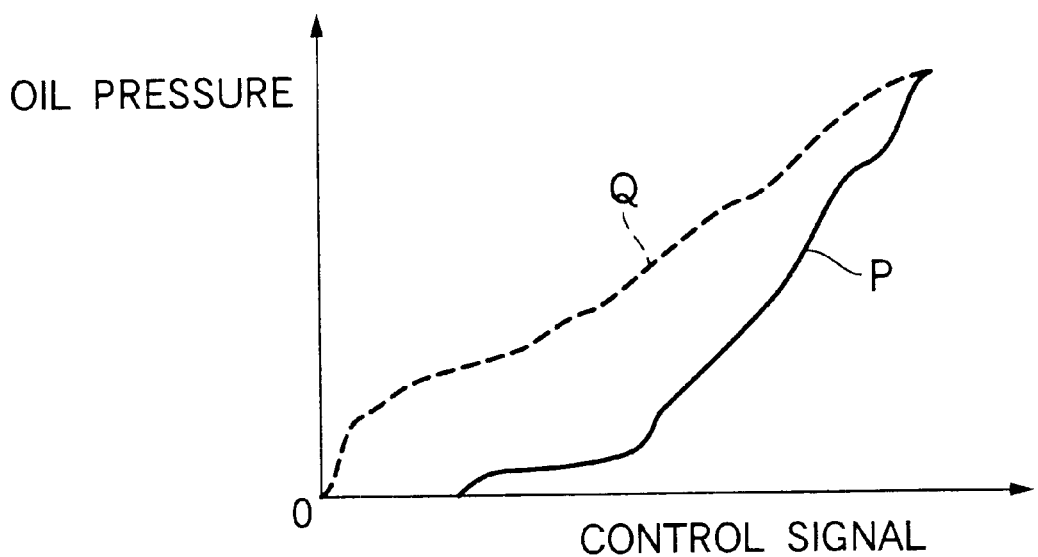

As long as the linear solenoid valve functions properly, as shown in FIG. 6A, the solenoid valve exhibits substantially the same characteristics both when the control signal is increased (the solid line P) and when the control signal is decreased (the broken line Q). However, in the event that the linear solenoid valve becomes abnormal, as shown in FIG. 6B, the linear solenoid valve may come to exhibit different characteristics between when the control signal is increased (a solid line P) and when the control signal is decreased (a broken line Q). Since there is caused a problem that the transmission control becomes imprecise in case the linear solenoid valve having such characteristics is used to regulate the engagement oil pressure, the apparatus of the invention is designed such that abnormalities of the linear solenoid valve are detected.

Apparatus and method for detecting abnormalities constructed as described above will be described below. As shown in FIG. 1, this detection of abnormalities is carried out based on an abnormalities diagnosis program from an external diagnosis unit 70 by connecting the external diagnosis unit 70 to the electronic control unit 60. In addition, in this embodiment, while an example will be described in which the external diagnosis unit 70 is connected to the electronic control unit 60 for detecting abnormalities, the abnormalities diagnosis program may be incorporated in the electronic control unit 60 and abnormalities detection may be performed as required based on the incorporated program without using the external diagnosis unit 70.

This external diagnosis unit 70 is adapted to detect abnormalities of the first to third linear solenoid valves 51 to 53, as well as various types of abnormalities of the transmission control unit, and the detection of abnormalities will be described below. The detection of abnormalities is carried out individually for each of the first to third linear solenoid valves 51 to 53. Owing to this, firstly, the actuation of the group of circuit switching solenoid valves 55 is controlled from the external diagnosis unit 70 via the electronic control unit 60, and any of the linear solenoid valve is caused to communicate with the second clutch-12 on which the first hydraulic switch 61 is provided or the third clutch 13 on which the second hydraulic switch 62 is provided. Then, an engagement control oil pressure that has been regulated by any of the linear solenoid valves that provides such a communication is supplied to the clutch with which the linear solenoid valve is allowed to communicate for detecting the actuation of the hydraulic switch provided therein so as to implement the determination of abnormalities.

Here, while the group of circuit switching solenoid valves 55 are aimed to set engagement control oil pressure supply paths to the respective clutches via the transmission control valve 50, in control, a pattern in which an engagement control oil pressure regulated by the first or second linear solenoid valve 51, 52 is supplied to the second clutch 12 and a pattern in which an engagement control oil pressure regulated by the third linear solenoid valve 53 is supplied to the third clutch 13 are set according to speed change conditions. Owing to this, the detection of abnormalities of the first linear solenoid valve 51 is implemented by allowing the same valve to communicate with the second clutch 12, the detection of abnormalities of the second linear solenoid valve 52 is implemented by allowing the same valve to the second clutch 12, too, and the detection of abnormalities of the third linear solenoid valve 53 is implemented by allowing the same valve to communicate with the third clutch 13.

Figure 7:
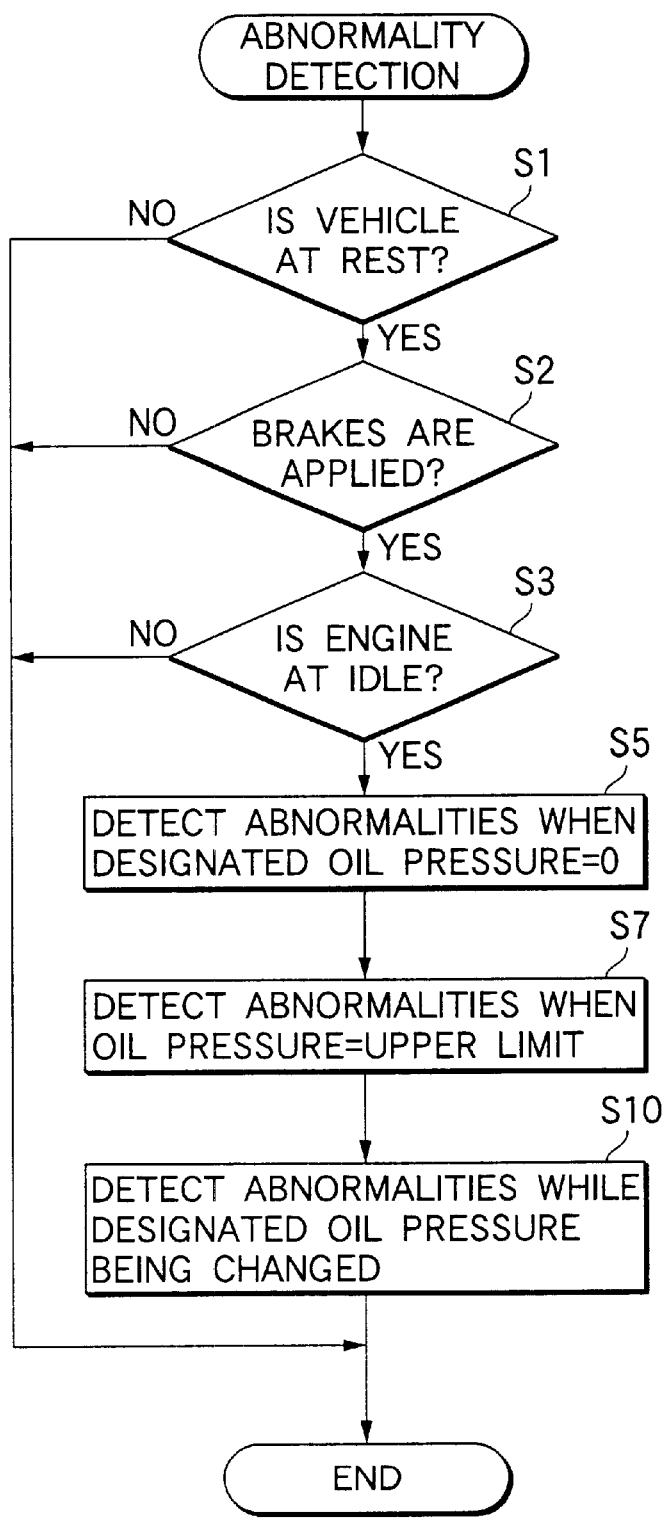
FIG. 7 is a flowchart showing the details of abnormalities detection according to the invention.

The detection of abnormalities will be described below with reference to an example in which the first linear solenoid valve 51 is allowed to communicate with the second clutch 12. Note that since the detection of abnormalities of the second and third linear solenoid valves 52, 53 can be implemented in a similar manner, the description thereof will be omitted herein. The details of the detection of abnormalities are shown in FIG. 7, and first of all, whether or not the vehicle is at rest (step S1), whether or not the brakes of the vehicle are being applied (step S2) and whether or not the engine is at idle (step S3) are determined, and an abnormalities detection is carried out only when the vehicle is at rest, the brakes of the vehicle are being applied and the engine is at idle.

This abnormalities detection has an abnormalities detection (step S5) to be performed in a state in which a control signal (a control signal representing a designated oil pressure=0) is outputted to the first linear solenoid valve 51 to make the engagement control oil pressure zero, an abnormalities detection (step S7) to be performed in a state in which a control signal (a control signal representing a designated oil pressure=upper limit) is outputted to the first linear solenoid 51 to make the engagement control oil pressure the upper limit and an abnormalities detection (step S10) to be performed while outputting a control signal to vary the engagement control oil pressure that is regulated by the first linear solenoid valve 51.

Referring to FIG. 8, the contents of the abnormalities detections to be performed in steps S5 and S7 will be described. Firstly, the abnormalities detection to be performed in step S5 with the designated oil pressure=0 will be described. This abnormalities detection is carried out by detecting the ON/OFF state of the first hydraulic switch 61 and the engagement state of the second clutch 12. The first hydraulic switch 61 is a switch adapted to be switched on upon receipt of an oil pressure which is equal to or greater than a switching oil pressure required to start the engagement of the second clutch 12 and is in an OFF state when the switch is receiving an oil pressure which is less than the switching oil pressure. In addition, the engagement of the second clutch 12 is determined based on whether or not the rotating speed NM of a transmission input shaft (the first input shaft 1 or the second input shaft 2) is rotated according to the engine idling speed and whether or not the second clutch 12 is put into engagement with the vehicle being at rest to stop the rotation of the output shaft of the torque converter TC, whereby the torque converter TC is put in a stall state to be stopped.

Note that while in this embodiment the engagement of the second clutch 12 is determined from the revolution speed NM of the input shaft, another method may be used to determine the engagement of the second clutch 12. For example, the engagement of the second clutch 12 may be determined based on a difference between input and output revolution speeds of the second clutch 12 or difference between input and output revolution ratios. And, the engagement may be determined based on the change of the engine speed NE. In addition, as shown in FIG. 11, the engine speed NE becomes a non-loaded idling speed NE0 when the clutch is released, whereas when the clutch is engaged the torque converter TC stalls and the engine speed decreases to a stall idling speed NE1.

As shown in FIG. 8, it is considered that a state in which the second clutch 12 becomes released with the designated oil pressure=0 and the first hydraulic switch 61 switched on (this is when the revolution speed NM of the transmission input shaft corresponds to the engine speed, and this is referred to as an off-gear state) is a state in which the first hydraulic switch 61 is put in a ON state with the engagement control oil pressure of the second clutch 12 which is regulated by and supplied from the first linear solenoid valve 51 being substantially zero, and this state can be determined as an abnormality that the first hydraulic switch 61 is kept switched on. On the other hand, it is considered that a state in which the first hydraulic switch 61 is on with the second clutch 12 being in engagement (this is when a transmission input shaft revolution speed NM=0, and this is referred to as an in-gear state) is a state in which an oil pressure is supplied from the first linear solenoid valve 51 to bring the second clutch 12 into engagement while the designated oil pressure=0, and this can be determined as an abnormality that the first linear solenoid valve 51 sticks to the ON side (a side where the oil pressure is generated).

Next, when the first hydraulic switch 61 is off, in case the second clutch 12 is in the off-gear state, the linear solenoid valve is normal. However, in case the second clutch 12 is in the in-gear state, it is considered as a state in which the second clutch 12 is in an engaged state while the engagement control oil pressure is substantially zero or a state in which there is a failure of an engagement detection of the second clutch 12, and therefore this can be determined as an abnormality that the second clutch 12 sticks to be in the engaged state, an abnormality of an engagement control valve system of the second clutch 12 or an abnormality of the engine speed sensor 65.

Next, an abnormalities detection that is performed in step S7 with the designated oil pressure=upper limit will be described. This abnormalities detection is also implemented through detection of the on/off state of the first hydraulic switch 61 and the engagement of the second clutch 12. Firstly, when the first hydraulic switch 61 is switched on, in case the second clutch 12 is in the in-gear state, it is normal. However, in case the second clutch 12 is in the off-gear state, it is considered as a state in which a predetermined engagement control oil pressure is being outputted while the second clutch 12 is being released or a state in which there exists a failure of detection of the engagement of the second clutch 12, and this can be determined as an abnormality of the second clutch 12 itself or the engine speed sensor 65.

On the other hand, when the first hydraulic switch 61 is off whereas the second clutch 12 is in the off-gear state, it is considered that the engagement control oil pressure supplied from the first linear solenoid valve 51 to the second clutch 12 is substantially zero, it can be determined that there exists an abnormality that the first linear solenoid valve 51 sticks to the off side (a side where no oil pressure is outputted) On the contrary, when the first hydraulic switch 61 is off whereas the second clutch is in the in-gear state, it is considered that the first hydraulic switch 61 cannot be detected whereas an engagement control oil pressure sufficient to bring the second clutch 12 into engagement is supplied from the first linear solenoid valve 51 to the second clutch 12, and it can be determined that there exists an abnormality that the first hydraulic switch 61 is put in the off state.

Figure 9:
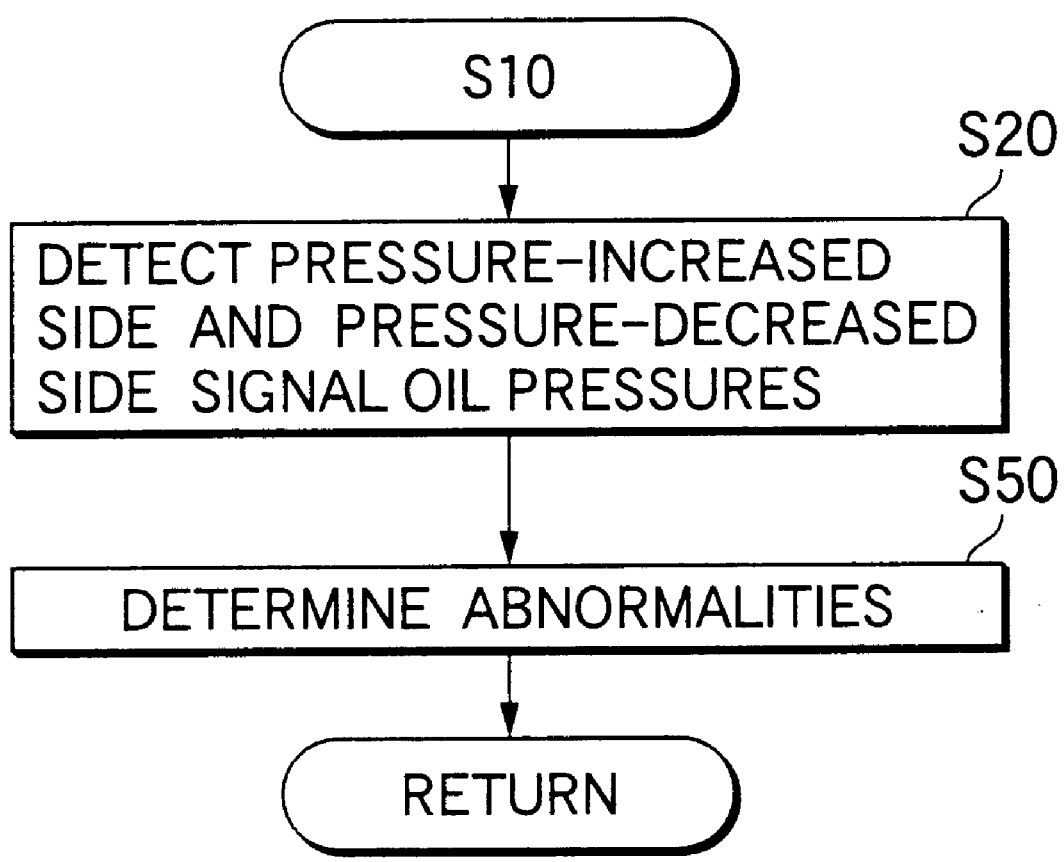
FIG. 9 is a flowchart showing the details (the details in step S10 in the flowchart shown in FIG. 7) of abnormalities detection according to the invention.

When the abnormalities detections in step S5 and step S7 have been completed as described above, then an abnormalities detection carried out while varying the designated oil pressure in step S10 is carried out. The basic structure of this abnormalities detection is shown in FIG. 9. A pressure-increased side signal oil pressure is detected while varying gradually the designated oil pressure from zero (a predetermined lower pressure) to a maximum (a predetermined higher pressure), and then a pressure-decreased side signal oil pressure is detected while varying gradually the designated oil pressure from the maximum (the predetermined higher pressure) to zero (the predetermined lower pressure) (step S30), following this, an abnormalities determination is implemented based on these detected signal oil pressures (step S50).

Firstly, referring to FIG. 10, the contents of a detection in step S20 will be described. Here, firstly, it is determined whether or not a pressure increase completion flag F(UP) which is set when the designated oil-pressure has been gradually increased to an upper limit is 1, F(UP)=1, namely, whether or not the flag is set (step S22). When F(UP)=0, the flow proceeds to step S23, where a designated oil pressure PI (an oil pressure to cause the linear solenoid valve to implement regulation and setting based on a control signal) which is designated by a control signal is increased by a predetermined amount ΔP.

Then, it is determined whether or not a first switch flag FPS1 which is set when the first hydraulic switch 61 is switched off from on is 1, FPS1=1 (step S24), and when the flag is set (when FPS1=1), the flow proceeds to step S27. On the other hand, when FPS1=0, then the flow proceeds to step S25, where it is determined whether or not the first hydraulic switch 61 is switched on. Then, when it is determined that the switch has been switched on, the then designated oil pressure PI is stored as a first pressure-increased side signal oil pressure PUP1, and 1 is set on the first switch flag FPS1 (step S26).

Next, in step S27, it is determined whether or not an engagement flag FNM1 which is set when the second clutch 12 is brought into engagement is 1, FNM1=1, and when this flag is set then the flow proceeds to step S30. On the other hand, when FNM1=0, the flow proceeds to step S28, and it is determined whether or not the transmission input shaft rotation NM has become zero, namely, whether or the second clutch 12 has started engagement. When this variation is detected, the then designated oil pressure PI is stored as a second pressure-increased side signal oil pressure PUP2, and the engagement flag FNM1 is set to 1 (step S29). Then, in step S30, it is determined whether or not the designated oil pressure PI has reached the upper limit (MAX), and when the pressure has reached the upper limit the pressure increase completion flag F(UP) is set to 1. (step S31).

The flow of steps S22 to S31 that has just been described is repeatedly performed at predetermined intervals, the designated oil pressure PI is increased gradually to the upper limit (MAX) (or the pressure is increased by ΔP at each predetermined interval). As a result, in case the first linear solenoid valve 51 functions properly, working fluid regulated to the designated oil pressure PI is supplied to the second clutch 12. FIG. 11 shows time variation of the designated oil pressure PI, time variation of the engine speed NE, on/off signal variation of the first hydraulic switch 51 and time variation of the transmission input shaft revolution speed NM. The designated oil pressure PI is zero at time t, and this pressure increases in a certain proportion and reaches the upper limit at time t2. Owing to this, the pressure increase completion flag F(UP) is set to 1 at time t2.

When the designated oil pressure PI is increased like this the oil pressure which has been regulated and supplied in conjunction with the increase acts on the second clutch 12 and the first hydraulic switch 61. In this example, it is detected that the transmission input shaft revolution speed NM became zero at time t1 and that the second clutch 12 started engagement at the same time. Owing to this, the then designated oil pressure PI (a designated oil pressure at point A) was stored as a second pressure-increased side signal oil pressure PUP2, and the engagement flag FNM1 was set to 1. Furthermore, the first hydraulic switch 61 was switched on from off at time t11. Owing to this, the then designated oil pressure PI (a designated oil pressure at point C) was stored as the first pressure-increased side signal oil pressure PUP1, and the first switch flag FPS1 was set to 1. Thereafter, when the designated oil pressure PI reaches the upper limit at time t2, the pressure increase completion flag F(UP) is set to 1.

Figure 10:
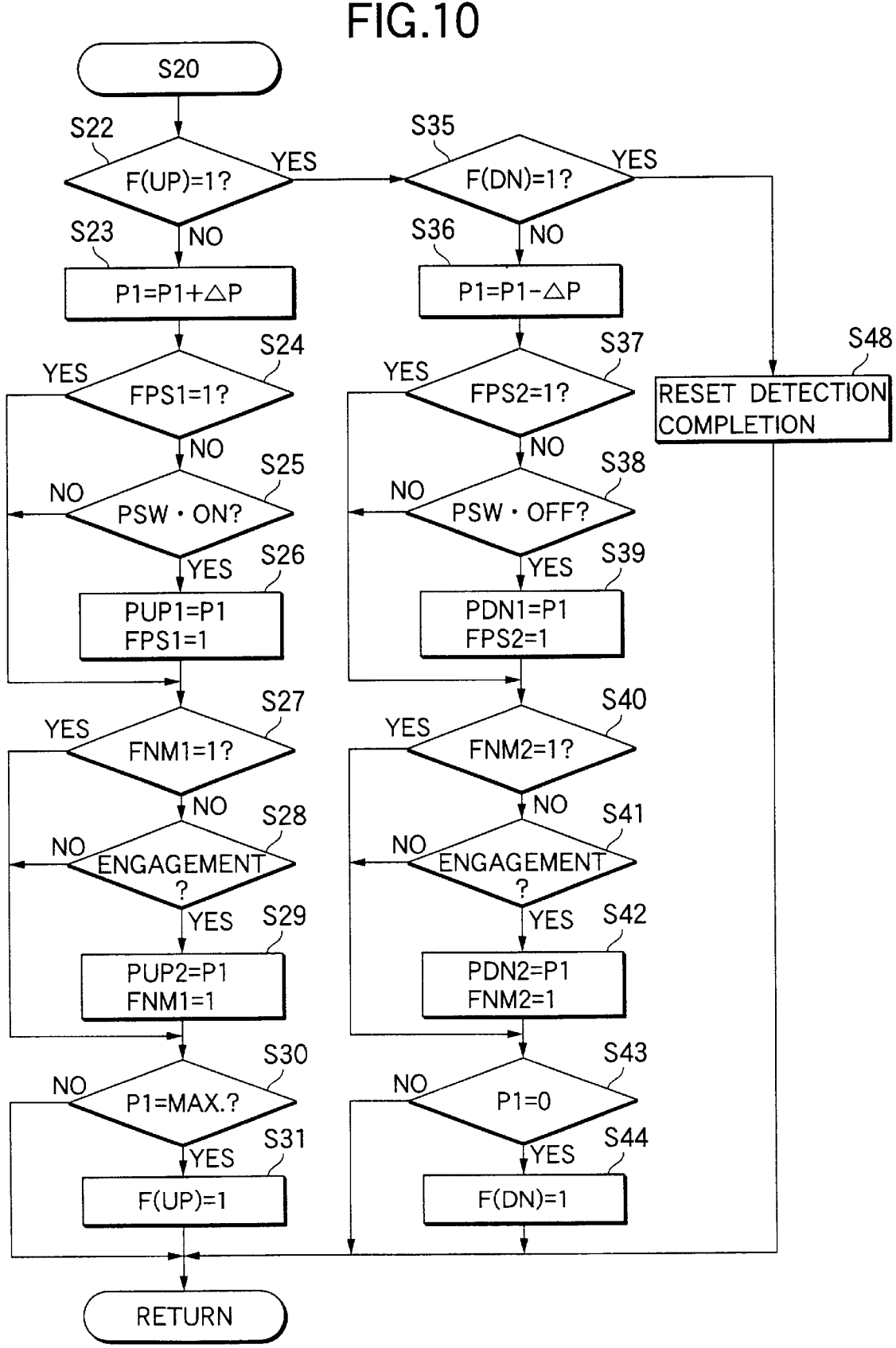
FIG. 10 is a flowchart showing the details (the details in step S20 in the flowchart shown in FIG. 9) of abnormalities detection according to the invention.

When the pressure increase completion flag F(UP)=1, in FIG. 10, the flow proceeds from step S22 to S35, where it is determined whether or not a pressure decrease completion flag F(DN) which is set when the designated oil pressure that has reached the upper limit is decreased gradually to zero is 1, F(DN)=1, namely, whether or not the flag is set. When F(DN)=0, then the flow proceeds to step S36, where the designated oil pressure PI which has been increased to the upper limit is then decreased by the predetermined amount ΔP.

Then, it is determined whether or not a second switch flag FPS2 which is set when the first hydraulic switch 61 is switched off from on is 1, FPS2=1 (step S37), and when this flag is set (FPS2=1) the flow proceeds to step S40. On the other hand, when FPS2=0, the flow proceeds to step S38, where it is determined whether or not the first hydraulic switch 61 has been switched off. Then, when it is determined that the switch has been switched off the then designated oil pressure PI is stored as a first pressure-decreased side signal oil pressure PDN1, and 1 is set on the second switch flag FPS2 (step S39).

Next, in step S40, it is determined whether or not a release flag FNM2 that is set when the release of the second clutch 12 has is detected is 1, FNM2=1, and when this flag is set, the flow proceeds to step S41. On the other hand, when FNM2=0, the flow proceeds to step S41, it is determined whether or not the transmission input shaft revolution speed NM has been varied from zero to an idling-corresponding revolution speed, namely, whether or not the second clutch 12 has started to be released. When this variation has been detected the then designated oil pressure PI is stored as a second pressure-decreased side signal oil pressure PDN2, and the release flag FNM2 is set to 1 (step S42). Then, in step S43, it is determined whether or not the designated oil pressure PI has become zero, and when the pressure has become zero, the pressure decrease completion flag F(DN) is set to 1.

The flow of steps S22 to S35 to S44 that has been just described is repeated performed at predetermined intervals, the designated oil pressure PI is decreased gradually from the upper limit (MAX) to zero (namely, decreased by ΔP at each predetermined interval). As a result, as shown in FIG. 11, the designated oil pressure PI that has reached the upper limit is decreased in a certain proportion and becomes zero at time t4, and the pressure decrease completion flag F(DN) is set to 1.

When the designated oil pressure PI is decreased in this way, in this example, the first hydraulic switch 61 was switched off from on at time t12. Owing to this, the then designated oil pressure PI (a designated oil pressure at point D) was stored as the first pressure-decreased side signal oil pressure PDN1, and a second switch flag FPS2 was set to 1. Furthermore, that the second clutch 12 has started to be released was detected at time t3. Owing to this, the then designated oil pressure PI (a designated oil pressure at point B) was stored as the second pressure-decreased side signal oil pressure PDN2, and the release flag NM2 was set to 1. Thereafter, when the designated oil pressure PI became zero at time t4, the pressure decrease completion flag F (DN) was set to 1 and the control flow proceeds from step S35 to step S48, where the detection is determined as having been completed, and a reset operation is performed.

Figure 12:
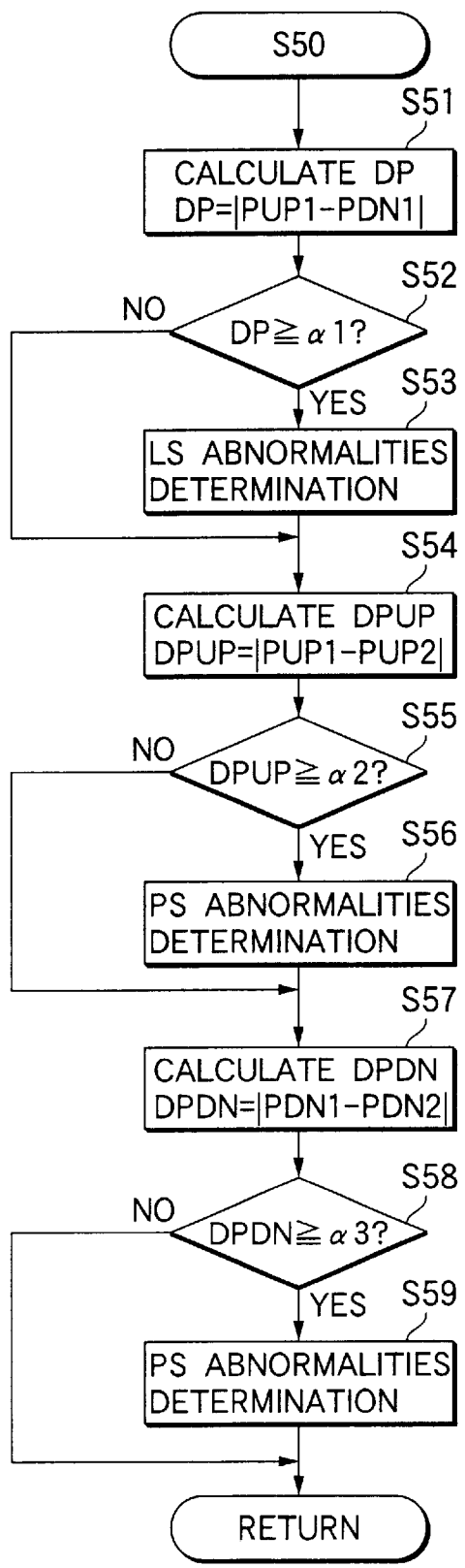
FIG. 12 is a flowchart showing the details (the details in step S50 in the flowchart shown in FIG. 9) of abnormalities detection according to the invention.

When the flow in step S20 is completed a flow in step S50 shown in FIG. 12 is performed. Here, in step S51, an absolute value DP (this is referred to as a first signal oil pressure difference DP) is calculated which is a difference between the first pressure-increased side signal oil pressure PUP1 and the first pressure-decreased side signal oil pressure PDN1. Then, it is determined whether or not this first signal oil pressure difference DP is equal to or larger than a first abnormalities determination value $\alpha 1$ (step S52), and when $DP \geq \alpha 1$, it is determined that the first linear solenoid valve is abnormal (step S53).

The first pressure-increased side signal oil pressure PUP1 is a designated oil pressure when the first hydraulic switch 61 is switched on from off when the engagement control oil pressure that is supplied to the second clutch 12 becomes equal to or larger than the switching oil-pressure, while the first pressure-decreased side signal oil pressure PDN1 is a designated oil pressure when the first hydraulic switch 61 is switched on from off when the engagement control oil pressure that is supplied to the second clutch 12 in the engaged state becomes less than the switching oil pressure, and basically both the signal pressures PUP1, PDN1 must be values which are equal or closer to each other. Owing to this, when the first signal oil pressure difference DP which is the difference between the two signal oil pressures is increased to be far larger than the first abnormalities determination value $\alpha 1$, the resultant state becomes a state shown in FIG. 6B, and it is determined that the first linear solenoid valve 51 is abnormal.

Next, in step S54, an absolute value DPUP (this is referred to as a second signal oil pressure difference DUPU) is calculated which is a difference between the first pressure-increased side signal oil pressure PUP1 and the second pressure-increased side signal oil pressure PUP2. Then, it is determined whether or not the second signal oil pressure difference DUPU is equal to or larger than a second abnormalities determination value $\alpha 2$ (step S55), and when $DP \geq \alpha 2$, it is determined that the first hydraulic switch 61 is abnormal (step S56).

The first pressure-increased side signal oil pressure PUP1 is a designated oil pressure when the first hydraulic switch 61 is switched on from off when the engagement control oil pressure that is supplied to the second clutch 12 becomes equal to or larger than the switching oil pressure, while the second pressure-increased side signal oil pressure PUP2 is a designated oil pressure when the second clutch 12 actually starts to be engaged. Here, the switching oil pressure is set to become the engagement initiation oil pressure of the second clutch 12, and basically both the signal oil pressures have to be values which are equal or closer to each other. Owing to this, when the second signal oil pressure difference DPUP which is the difference between the two signal oil pressures is increased to be far larger than the second abnormalities determination value $\alpha 2$, it is determined that the first hydraulic switch 61 is abnormal.

Next, in step S57, an absolute value DPDN (this is referred to as a third signal oil pressure difference DPDN) is calculated which is a difference between the first pressure-decreased side signal oil pressure PDN1 and the second pressure-decreased side signal oil pressure PDN2. Then, it is determined whether or not the third signal oil pressure difference DPDN is equal to or larger than a third abnormalities determination value $\alpha 3$ (step S58), and when DP$\geq \alpha 3$, it is determined that the first hydraulic switch 61 is abnormal (step S59).

The first pressure-decreased side signal oil pressure PDN1 is a designated oil pressure when the first hydraulic switch 61 is switched off from on when the engagement control oil pressure that is supplied to the second clutch 12 becomes less than the switching oil pressure, while the second pressure-decreased side signal oil pressure PDN2 is a designated oil pressure when the second clutch 12 actually starts to be released. Owing to this, when the third signal oil pressure difference DPDN which is the difference between the two signal oil pressures is increased to be far larger than the third abnormalities determination value $\alpha 3$, it is determined that the first hydraulic switch 61 is abnormal.

In addition, the determination in steps S54 to S56 and the determination in step S57 to S59 are both aimed to determine abnormalities of the first hydraulic switch, and either of the determinations may be performed.

In the above embodiment, while the example has been described in which the clutch engagement oil pressure control of the transmission is implemented by the linear solenoid valves, the application of the oil pressure regulated by the linear solenoid valve is not limited thereto, and the invention may be applied to various types of hydraulic devices adapted to be actuated upon receipt of oil pressure force.

As has been described heretofore, according to the apparatus and method for detecting abnormalities of the linear solenoid valve according to the invention, it is constructed that the linear solenoid valve is diagnosed as being abnormal when the difference between the pressure-increased side signal oil pressure and the pressure-decreased side signal oil pressure which are both signal pressures when the hydraulic switch is switched on and off exceeds the abnormalities determination value, and the existence of abnormalities of the linear solenoid valve can be detected easily using the relatively inexpensive hydraulic switch (without using the oil pressure sensor for detecting the value of an oil pressure).

According to the further apparatus and method for detecting abnormalities of the hydraulic device according to the invention, the engagement control oil pressure that is supplied to the frictional engagement element is designed to be regulated by the linear solenoid valve, and the regulated engagement control oil pressure is designed to act on the hydraulic switch which is switched on and off at the engagement control oil pressure, as the switching oil pressure, at which the frictional engagement element starts to be engaged, whereby the linear solenoid valve is determined as being abnormal when the difference between the first pressure-increased side signal oil pressure and the first pressure-decreased side signal oil pressure exceeds the first abnormalities determination value. In this case, too, the abnormalities of the linear solenoid valve can be detected easily using the relatively inexpensive hydraulic switch (without using the oil pressure sensor for detecting the value of an oil pressure). In addition, in many cases, the hydraulic switch is provided in the hydraulic device such as the transmission control valve of the automatic transmission, and in this case, the abnormalities detection can be implemented easily anytime using the hydraulic switch without selecting any specific place for detection.

The apparatus for detecting abnormalities is provided with an engagement detection unit (for example, the electronic control unit 60 adapted to be actuated upon receipt of a detection signal from an engine speed sensor 65 in the embodiment) for detecting an engagement of the frictional engagement element, wherein a control signal is sent from the valve actuating controller to the linear solenoid valve to increase the engagement control oil pressure from the predetermined lower pressure to the predetermined higher pressure to thereby cause the linear solenoid valve to regulate the frictional engagement control oil pressure, during which a second pressure-increased side signal oil pressure resulting when the engagement of the frictional engagement element is started is detected by the engagement detection unit, whereby the hydraulic switch may be diagnosed as being abnormal when a difference between the first pressure-increased side signal oil pressure and the second pressure-increased side signal oil pressure exceeds a second abnormality determination value.

The apparatus for detecting abnormalities is provided with an engagement detection unit for detecting an engagement of the frictional engagement element, wherein a control signal is sent from the valve actuating controller to the linear solenoid valve to decrease the engagement control oil pressure from the predetermined higher pressure to the predetermined lower pressure to thereby cause the linear solenoid valve to regulate the frictional engagement control oil pressure, during which a second pressure-decreased side signal oil pressure resulting when the release of the frictional engagement element is started is detected by the engagement detection unit, whereby the hydraulic switch is diagnosed as being abnormal when a difference between the first pressure-decreased side signal oil pressure and the second pressure-decreased side signal oil pressure exceeds a third abnormality determination value.

The hydraulic switch is set to use as the switching oil pressure the engagement control oil pressure at which the engagement of the frictional engagement element is started, and as described above, in the event that the difference between the first pressure-increased side signal oil pressure and the second pressure-increased side signal oil pressure exceeds the second abnormality determination value, or in the event that the difference between the first pressure-decreased side signal oil pressure and the second pressure-decreased side signal oil pressure exceeds the third abnormality determination value, it is considered that an abnormality is being caused such as the set switching oil pressure at which the hydraulic switch is switched on and off is deviated or the hydraulic switch fails to operate properly. Then, according to the invention, abnormalities of the hydraulic switch can also be detected based on the above determination.

In addition, in the invention, in the event that the frictional engagement element is used as a clutch for a transmission for controlling speed changes of a vehicle or as a brake, the detection of engagement of the frictional engagement element by the engagement detection unit is implemented with the vehicle being at halt, the brakes of the vehicle being applied and an engine of the vehicle being in an idle state. Furthermore, in a construction in which a torque converter is disposed at an input portion of the transmission in such a manner as to be connected to an output shaft of the engine and in which a transmission mechanism whose actuation is controlled by the frictional engagement element is provided in such a manner as to be connected to an output side of the torque converter, it is preferable that abnormalities are detected with the abnormality detecting apparatus according to the invention.

What is claimed is:

1. An apparatus for detecting an abnormality of a linear solenoid valve comprising:

the linear solenoid valve for regulating a control oil pressure that is supplied to a hydraulic device based on a control signal;

a hydraulic switch set to be switched on and off when an oil pressure variation is applied thereto which overpasses a predetermined switching oil pressure, the hydraulic switch being disposed in such a manner as to receive the control oil pressure regulated by the linear solenoid valve; and a valve actuating controller sending out the control signal to the linear solenoid valve, wherein the control signal is sent from the valve actuating controller to the linear solenoid valve to increase the control oil pressure from a predetermined lower pressure which is lower than the switching oil pressure to a predetermined higher pressure which is higher than the switching oil pressure to thereby cause the linear solenoid valve to regulate the control oil pressure, during which, when the hydraulic pressure switch is switched on and off, a pressure-increased side signal oil pressure is detected which corresponds to the control signal outputted from the valve actuating controller, wherein the control signal is sent from the valve actuating controller to the linear solenoid valve to decrease the control oil pressure from the predetermined higher pressure to the predetermined lower pressure, during which, when the hydraulic pressure switch is switched on and off a pressure-decreased side signal oil pressure is detected which corresponds to the control signal outputted from the valve actuating controller, and wherein the linear solenoid valve is diagnosed as being abnormal when a difference between the pressure-increased side signal oil pressure and the pressure-decreased side control oil pressure exceeds an abnormality determination value.

2. A method for detecting the existence of an abnormality of a linear solenoid valve for regulating a control oil pressure that is supplied to a hydraulic device based on a control signal, the method comprising the steps of:

preparing a hydraulic switch disposed at a position receiving the control oil pressure which has been regulated by the linear solenoid valve and set to be switched on and off when an oil pressure variation is applied thereto which overpasses a predetermined switching oil pressure;

first sending the control signal to the linear solenoid valve to increase the control oil pressure from a predetermined lower pressure which is lower than the switching oil pressure to a predetermined higher pressure which is higher than the switching oil pressure, while the first sending step is being implemented, detecting a pressure-increased side signal oil pressure which corresponds to the control signal resulting when the hydraulic pressure switch is switched on and off upon receipt of the control oil pressure which has been regulated by the linear solenoid valve, second sending the control signal to the linear solenoid valve to decrease the control oil pressure from the predetermined higher pressure to the predetermined lower pressure, while the second sending step is being implemented, detecting a pressure-decreased side signal oil pressure which corresponds to the control signal resulting when the hydraulic pressure switch is switched on and off upon receipt of the control oil pressure which has been regulated by the linear solenoid valve, and diagnosing that the linear solenoid valve is abnormal when a difference between the pressure-increased side signal oil pressure and the pressure-decreased side control oil pressure exceeds an abnormality determination value.

3. An apparatus for detecting abnormalities of a hydraulic device comprising:

a frictional engagement element adapted to be brought into engagement upon receipt of an oil pressure force, a linear solenoid valve for regulating an engagement control oil pressure which is supplied to the frictional engagement element;

a hydraulic switch set to be switched on and off when an oil pressure variation is applied thereto which overpasses a switching oil pressure which is an engagement control oil pressure at which the frictional engagement element starts to be brought into engagement, the hydraulic switch being disposed in such a manner as to receive the control oil pressure that has been regulated by the linear solenoid valve; and a valve actuating controller for controlling the actuation of the linear solenoid valve so as to make the linear solenoid valve implement the regulation of the engagement control oil pressure, wherein the control signal is sent from the valve actuating controller to the linear solenoid valve to increase the engagement control oil pressure from a predetermined lower pressure which is lower than the switching oil pressure to a predetermined higher pressure which is higher than the switching oil pressure to thereby cause the linear solenoid valve to regulate the engagement control oil pressure, during which, when the hydraulic switch is switched on and off, a first pressure-increased side signal oil pressure is detected which corresponds to the control signal outputted from the valve actuating controller, wherein the control signal is sent from the valve actuating controller to the linear solenoid valve to decrease the engagement control oil pressure from the predetermined higher pressure to the predetermined lower pressure, during which, when the hydraulic switch is switched on and off, a first pressure-decreased side signal oil pressure is detected which corresponds to the control signal outputted from the valve actuating controller, and wherein the linear solenoid valve is diagnosed as being abnormal when a difference between the first pressure-increased side signal oil pressure and the first pressure-decreased side control oil pressure exceeds a first abnormality determination value.

4. The apparatus for detecting abnormalities as set forth in claim 3, comprising:

an engagement detection unit detecting an engagement of the frictional engagement element, wherein the control signal is sent from the valve actuating controller to the linear solenoid valve to increase the engagement control oil pressure-from the predetermined lower pressure to the predetermined higher pressure to thereby cause the linear solenoid valve to regulate the frictional engagement control oil pressure, during which a second pressure-increased side signal oil pressure is detected which corresponds to the control signal resulting when the start of engagement of the frictional engagement element is detected by the engagement detection unit, and wherein the hydraulic switch is diagnosed as being abnormal when a difference between the first pressure-increased side signal oil pressure and the second pressure-increased side signal oil pressure exceeds a second abnormality determination value.

5. The apparatus for detecting abnormalities as set forth in claim 4, wherein the frictional engagement element is used as a clutch for a transmission for controlling speed changes of a vehicle or as a brake, and wherein the detection of engagement of the frictional engagement element by the engagement detection unit is implemented with the vehicle being at halt, the brakes of the vehicle being applied and an engine of the vehicle being in an idle state.

6. An apparatus for detecting abnormalities as set forth in claim 5, wherein a torque converter is disposed at an input portion of the transmission in such a manner as to be connected to an output shaft of the engine, and wherein a transmission mechanism whose actuation is controlled by the frictional engagement element is disposed in such a manner as to be connected to an output side of the torque converter.

7. The apparatus for detecting abnormalities as set forth in claim 3, comprising:

an engagement detection unit detecting an engagement of the frictional engagement element, wherein the control signal is sent from the valve actuating controller to the linear solenoid valve to decrease the engagement control oil pressure from the predetermined higher pressure to the predetermined lower pressure to thereby cause the linear solenoid valve to regulate the frictional engagement control oil pressure, during which a second pressure-decreased side signal oil pressure is detected which corresponds to the control signal resulting when the start of release of the frictional engagement element is detected by the engagement detection unit, and wherein the hydraulic switch is diagnosed as being abnormal when a difference between the first pressure-decreased side signal oil pressure and the second pressure-decreased side signal oil pressure exceeds a third abnormality determination value.

8. The apparatus for detecting abnormalities as set forth in claim 7, wherein the frictional engagement element is used as a clutch for a transmission for controlling speed changes of a vehicle or as a brake, and wherein the detection of engagement of the frictional engagement element by the engagement detection unit is implemented with the vehicle being at halt, the brakes of the vehicle being applied and an engine of the vehicle being in an idle state.

9. An apparatus for detecting abnormalities as set forth in claim 8, wherein a torque converter is disposed at an input portion of the transmission in such a manner as to be connected to an output shaft of the engine, and wherein a transmission mechanism whose actuation is controlled by the frictional engagement element is disposed in such a manner as to be connected to an output side of the torque converter.

10. A method for detecting the existence of an abnormality of a linear solenoid valve for regulating based on a control signal an engagement control oil pressure which is supplied to a frictional engagement element adapted to be brought into engagement upon receipt of an oil pressure force, the method comprising the steps of:

preparing a hydraulic switch set to be switched on and off when an oil pressure variation is applied thereto which overpasses a predetermined switching oil pressure, the hydraulic switch being disposed at a position to receive the engagement control oil pressure regulated by the linear solenoid valve and is set to be switched on and off at an engagement control oil pressure at which the frictional engagement element starts to be brought into engagement and which acts as the switching oil pressure;

first sending the control signal to the linear solenoid valve to increase the engagement control oil pressure from a predetermined lower pressure which is lower than the switching oil pressure to a predetermined higher pressure which is higher than the switching oil pressure;

while the first sending step is being implemented, detecting a first pressure-increased side signal oil pressure which corresponds to the control signal resulting when the hydraulic switch is switched on and off upon receipt of the engagement control oil pressure regulated by the linear solenoid valve;

second sending a control signal to the linear solenoid valve to decrease the engagement control oil pressure from the predetermined higher pressure to the predetermined lower pressure;

while the second sending step is being implemented, detecting a first pressure-decreased side signal oil pressure which corresponds to the control signal resulting when the hydraulic switch is switched on and off upon receipt of the engagement control oil pressure regulated by the linear solenoid valve; and diagnosing the linear solenoid valve as being abnormal when a difference between the first pressure-increased side signal oil pressure and the first pressure-decreased side control oil pressure exceeds a first abnormality determination value.

11. The method for detecting abnormalities as set forth in claim 10, further comprising the steps of:

detecting an engagement of the frictional engagement element when making the linear solenoid valve implement the regulation of the engagement control oil pressure by sending the control signal to the linear solenoid valve to increase the engagement control oil pressure from the predetermined lower pressure to the predetermined higher pressure, detecting a second pressure-increased side signal oil pressure which corresponds to the control signal resulting when the engagement of the frictional engagement element is started, diagnosing the hydraulic switch as being abnormal when a difference between the first pressure-increased side signal oil pressure and the second pressure-increased side signal oil pressure exceeds a second abnormality determination value.

12. The method for detecting abnormalities as set forth in claim 10, further comprising the steps of:

detecting an engagement of the frictional engagement element when making the linear solenoid valve implement the regulation of the engagement control oil pressure by sending a control signal to the linear solenoid valve to decrease the engagement control oil pressure from the predetermined higher pressure to the predetermined lower pressure;

detecting a second pressure-decreased side signal oil pressure which corresponds to the control signal resulting when the release of the frictional engagement element is started; and diagnosing the hydraulic switch as being abnormal when a difference between the first pressure-decreased side signal oil pressure and the second pressure-decreased side signal oil pressure exceeds a third abnormality determination value.

* * * * *